(12) United States Patent
Oh et al.

(10) Patent No.: US 7,474,480 B2
(45) Date of Patent: Jan. 6, 2009

(54) SUBMINIATURE IMAGING OPTICAL SYSTEM

(75) Inventors: Hye Ran Oh, Gyunggi-do (KR); In Cheol Chang, Gyunggi-do (KR); Ho Seop Jeong, Gyunggi-do (KR); Ho Sik You, Gyunggi-do (KR); Sang Hyuck Lee, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 11/987,387

(22) Filed: Nov. 29, 2007

(65) Prior Publication Data

US 2008/0130143 A1    Jun. 5, 2008

(30) Foreign Application Priority Data

Dec. 1, 2006    (KR)    ............... 10-2006-0121049

(51) Int. Cl.
*G02B 9/06* (2006.01)
*G02B 3/02* (2006.01)

(52) U.S. Cl. ..................... 359/794; 359/717
(58) Field of Classification Search ............ 359/708, 359/717, 793, 794
See application file for complete search history.

(56) References Cited

U.S. PATENT DOCUMENTS 2,350,133 A * 5/1944 Schade .................. 359/794
6,873,474 B2 * 3/2005 Shinohara ............... 359/717

* cited by examiner

*Primary Examiner*—William C Choi
*Assistant Examiner*—Jack Dinh

(57) ABSTRACT

A subminiature imaging optical system including: a first lens having overall positive refractive power, the first lens including a first lens part having a convex object-side surface, a second lens part having an object-side surface in contact with an image-side surface of the first lens part and a third lens part having an object-side surface in contact with an image-side surface of the second lens part; and a second lens having overall positive refractive power, the second lens including a fourth lens part having an object-side surface with a convex center and a concave peripheral portion, about an optical axis, a fifth lens part having an object-side surface in contact with an image-side surface of the fourth lens part and a sixth lens part having an object-side surface in contact with an image-side surface of the fifth lens part, wherein the second lens part has a stop provided on the object-side or image-side surface thereof.

7 Claims, 15 Drawing Sheets

SUBMINIATURE IMAGING OPTICAL SYSTEM

CROSS-REFERENCE TO RELATED APPLICATIONS

This application claims the priority of Korean Patent Application No. 2006-121049 filed on Dec. 1, 2006, in the Korean Intellectual Property Office, the disclosure of which is incorporated herein by reference.

BACKGROUND OF THE INVENTION

1. Field of the Invention

The present invention relates to a subminiature imaging optical system, and more particularly, to a subminiature imaging optical system installed in a mobile communication terminal and a personal digital assistant (PDA) or utilized in a surveillance camera and a digital camera.

2. Description of the Related Art

In general, mobile communication terminals had only functions of basic communication at their incipient stage. However, with increased use, the mobile communication terminals are required to have diversified functions ranging from photographing to image transmission and video communication, continuously evolving in their functions and services. Recently, a new expanded concept of mobile communication terminal by integrating digital camera technology with mobile phone technology, i.e., so called camera phones or camera mobile phones are significantly attracting attention.

In particular, the imaging optical system mounted on the camera phone is not only required to be miniaturized, lightweight and low-cost, but also have high resolution since the pixel size of an image sensor formed of a charge coupled device (CCD) or a complementary metal oxide semiconductor (CMOS) used in the imaging optical system is decreasing.

In order to satisfy miniaturization and low cost, the imaging optical system mounted on a small device such as a mobile phone needs to have lenses of as small a number as possible, but this restricts a degree of freedom in designing and undermines the optical capabilities. Especially, in the conventional imaging optical system, a stop is disposed in a portion excluding lenses to adjust light amount, thereby hampering reduction in size and weight of the optical system.

Therefore, there is required a subminiature imaging optical system which can be reduced in size and weight, while having high resolution and excellent aberrational characteristics.

SUMMARY OF THE INVENTION

An aspect of the present invention provides a subminiature imaging optical system which employs a fewer number of lenses and effectively corrects various aberrations such as astigmatism, spherical aberration, distortion and lateral chromatic aberration and also does not require a stop to be installed in a portion excluding lenses to adjust light amount, thereby reducing size and weight thereof.

An aspect of the present invention also provides a subminiature imaging optical system which adopts only two sheets of lenses to thereby achieve smaller size and high resolution.

An aspect of the present invention also provides a subminiature imaging optical system which can be easily mass-produced and is excellent in various optical properties.

According to an aspect of the present invention, there is provided a subminiature imaging optical system including: a first lens having overall positive refractive power, the first lens including a first lens part having a convex object-side surface, a second lens part having an object-side surface in contact with an image-side surface of the first lens part and a third lens part having an object-side surface in contact with an image-side surface of the second lens part; and a second lens having overall positive refractive power, the second lens including a fourth lens part having an object-side surface with a convex center and a concave peripheral portion, about an optical axis, a fifth lens part having an object-side surface in contact with an image-side surface of the fourth lens part and a sixth lens part having an object-side surface in contact with an image-side surface of the fifth lens part, wherein the second lens part has a stop provided on one of the object-side surface and the image-side surface thereof to adjust light amount.

The subminiature imaging optical system may satisfy following condition 1:

$$0.35 < r1/TTL < 0.8 \qquad \text{condition 1,}$$

wherein r1 is a radius of curvature of the object-side surface of the first lens part, and TTL is a distance between the object-side surface of the first lens part and an image plane.

The subminiature imaging optical system may satisfy following condition 2:

$$0.1 < |r5/r8| < 0.63 \qquad \text{condition 2,}$$

wherein r5 is a radius of curvature of the object-side surface of the fourth lens part, and r8 is a radius of curvature of an image-side surface of the sixth lens part.

At least one of the object-side surface of the first lens part, an image-side surface of the third lens part, the object-side surface of the fourth lens part and an image-side surface of the sixth lens part may be formed of an aspherical surface.

The object-side surfaces and the image-side surfaces of the second lens part and the fifth lens part may be formed of a planar surface.

The first lens part, the third lens part, the fourth lens part and the sixth lens part may be formed of polymer by a replica method.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
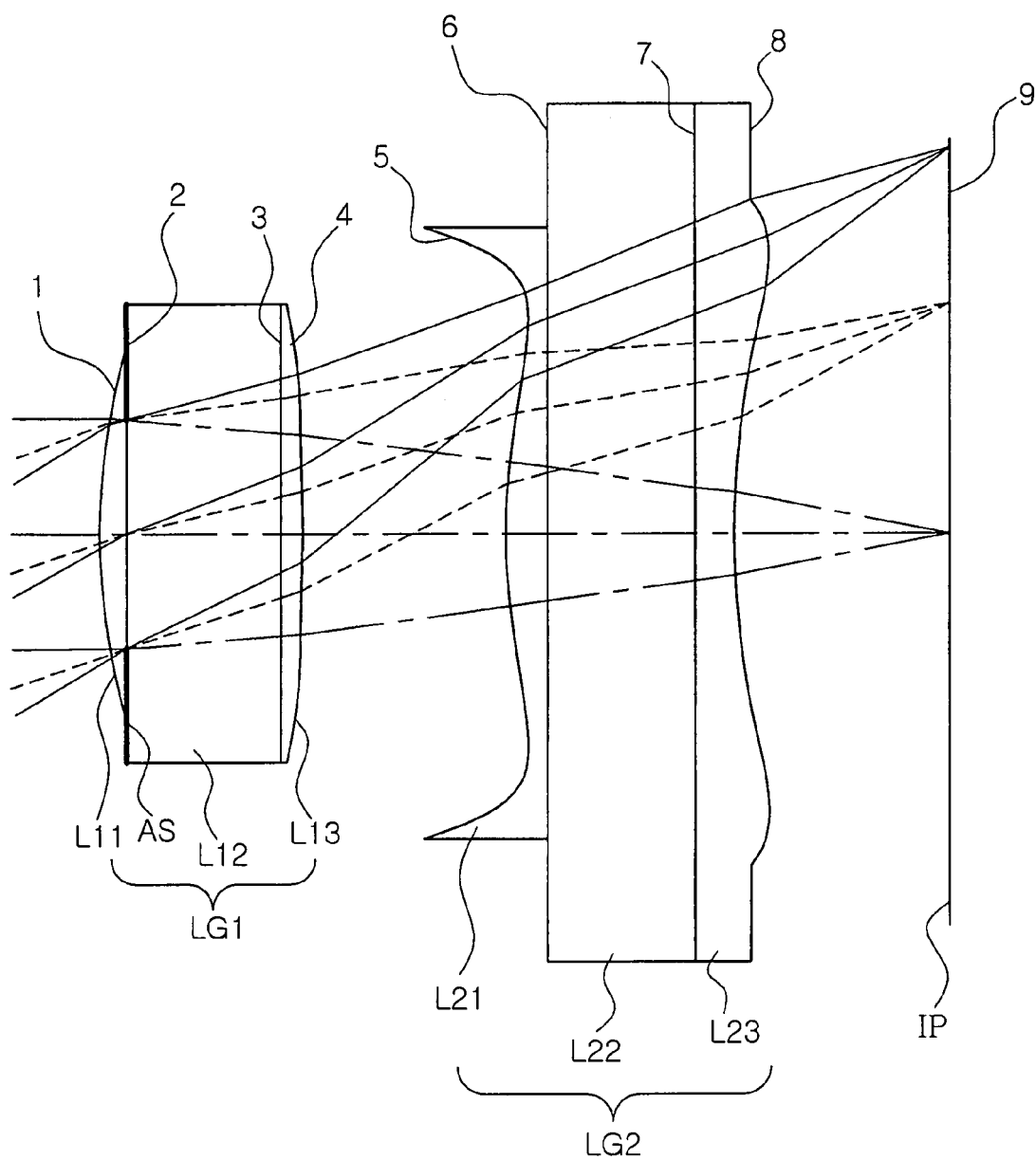
FIG. 1 is a lens configuration view illustrating a subminiature imaging optical system according to a first embodiment of the invention.

FIG. 1 is a lens configuration view illustrating a subminiature imaging optical system according to a first embodiment of the invention. In the following lens configuration views, the thicknesses, sizes and shapes of the lenses may be exaggerated for clarity. In particular, the shapes of spherical or aspherical surfaces shown in the views are only exemplary and should not be construed as limiting.

As shown in FIG. 1, the subminiature imaging optical system according to the first embodiment includes, sequentially from an object side, a first lens LG1, a second lens LG2 and an image sensor (not shown) corresponding to an image plane IP.

The first lens LG1 has overall positive refractive power, and includes three lens parts: a first lens part L11 having a convex object-side surface 1, a second lens part L12 having an object-side surface 2 in contact with an image-side surface of the first lens part L11, and a third lens part L13 having an object-side surface in contact with an image-side surface 3 of the second lens part L12.

Also, the second lens LG2 has overall positive refractive power, and includes three lens parts: a fourth lens part L21 having an object-side surface 5 with a convex center and a concave peripheral portion, about an optical axis, a fifth lens part L22 having an object-side surface 6 in contact with an image-side surface of the fourth lens part L21, and a sixth lens part L23 having an object-side surface 7 in contact with an image-side surface of the fifth lens part L22.

In first to fifth embodiments of the present invention, the object-side surface of the first lens part L11, an image-side surface of the third lens part L13, the object-side surface of the fourth lens part L21, and an image-side surface of the sixth lens part L23 are formed of an aspherical surface, but not limited thereto.

Here, a stop AS is installed on one of the object-side surface 2 and the image-side surface 3 of the second lens part L12. In first to third embodiments, the stop AS is disposed on the object-side surface 2 of the second lens part L12. But in fourth and fifth embodiments, the stop AS is disposed on the image-side surface 3 of the second lens part L12.

Particularly, the stop AS may be formed of a photo resist composition such as a black photo-resist, in place of a metal film using e.g., aluminum (Al) or chrome (Cr).

The stop AS of the present invention adopts a photo resist layer to be integrally formed on the object-side surface 2 or the image-side surface 3 of the second lens part L12 serving as a lens substrate.

Here, a photo resist refers to a polymer or a polymer composition altered in a molecular structure due to optical function and subsequently in physical properties thereof.

The photo resist as described above is chiefly formed of a polymer, a solvent and a sensitizer, and divided into a positive photo resist and a negative photo resist depending on type of development. The positive photo resist has an exposed portion removed after development whereas the negative photo resist has an exposed portion remaining after development.

As described above, the stop AS formed of the photo resist layer, when installed on the object-side surface 2 or the image-side surface 3 of the second lens part L12, simplifies a manufacturing process over a stop formed of a metal layer using e.g., aluminum (Al) or chrome (Cr). Moreover, the first lens LG1 formed by a replica method can be superbly bonded to an UV curing polymer used for the first lens part L11 and the third lens part L13.

Specifically, the stop AS, when formed of the metal layer using e.g., aluminum (Al) or chrome (Cr), is less bondable to the UV curing polymer due to high hydrophobic characteristics, therefore requiring an additional bonding layer on the metal layer.

Meanwhile, the stop As, when formed of the photo resist layer, is excellently bonded to the UV curing polymer owing to high hydrophilic characteristics of the photo resist, thus precluding a need for forming an additional metal layer on the photo resist layer.

Furthermore, a process of forming the stop AS as the metal layer entails sequential processes of exposure, and deposition and removal of the metal layer. On the other hand, a process of forming the stop AS as the photo resist layer only requires an exposure process due to characteristics of the photo resist, thereby reducing manufacturing costs and time.

Meanwhile, the metal layer using e.g., aluminum (Al) or chrome (Cr) has high reflectivity and thus light passed through the stop AS reflects unnecessary light reflected by other lens parts, consequently degrading resolution. The photo resist layer generally has a high light absorption in a visible ray region, thus preventing degradation in resolution owing to total internal reflection.

Here, the photo resist layer defining the stop AS may have a light absorption of at least 95% in a visible ray region.

In addition, the image sensor corresponds to an image plane IP, and is formed of a charge coupled device (CCD) and a complementary metal oxide semiconductor (CMOS) to sense an image of light passed through the first lens LG1 and the second lens LG2 and convert the image into an electrical signal.

In the meantime, an infrared ray filter and a cover glass corresponding to an optical low pass filter, a chromatic filter and a face plate may be installed behind the second lens LG2, but do not have a substantial effect on optical properties of the optical system of the present invention.

In the optical system according to the present invention, an overall length of the optical system is shortened through the first lens LG1 having a strong positive refractive power, thereby achieving miniaturization, and the second lens LG2 is configured to have a weak positive refractive power. Moreover, the second lens LG2 includes the fourth lens part L21 having the object-side surface 5 with a convex center and a concave peripheral portion about an optical axis and formed of an aspherical surface and the sixth lens part L23 having the image-side surface 8 formed of an aspherical surface, thereby correcting aberrations such as spherical aberration, astigmatism and distortion.

Furthermore, in the optical system of the present invention, a stop is not installed outside the lenses as an additional instrument to adjust light amount. In place thereof, the stop AS is disposed inside the first lens LG1, i.e., on the object-side surface 2 or the image-side surface 3 of the second lens part L12, thereby contributing to reduction in size and weight and notably correcting lateral chromatic aberration.

Also, as shown in FIG. 1, the first lens part L11 and the second lens part L12 of the first lens LG1 are configured to contact the object-side surface 2 and the image-side surface 3 of the second lens part L12, respectively.

Here, the first lens LG1 may be formed by a replica method, in which polymer is deposited on opposite surfaces of the second lens part L12 serving as a lens substrate to form the first lens part L11 and the third lens part L13. As described above, mass-production may be easily achieved when a wafer scale lens is formed by a replica method.

However, as long as at least one of the first lens part L11, the second lens part L12 and the third lens part L13 has a refractive index different from others, the first lens LG1 may be formed by a method including but not limited to the replica method. That is, when some of the three lens parts constituting the first lens LG1 can be configured to have different refractive indices so as to correct aberrations such as chromatic aberration, the first lens LG1 according to the present invention may be manufactured by a general method of manufacturing a doublet lens.

In addition, as shown in FIG. 1, the fourth lens part L21 and the sixth lens part L23 of the second lens LG2 are configured to contact the object-side surface 6 and the image-side surface 7 of the fifth lens part L22, respectively.

Here, in the same manner as the first lens LG1 described above, the second lens LG2 may be formed by the replica method in which polymer is deposited on opposite surfaces of the fifth lens part L22 serving as a lens substrate to form the fourth lens part L21 and the sixth lens part L23. However, as long as at least one of the fourth lens part L21, the fifth lens part L22 and the sixth lens part L23 can be configured to have a refractive index different from others, the second lens LG2 may be manufactured by a general method of manufacturing a doublet lens.

Also, in the drawings of the lens arrangements like FIG. 1, all of the object-side surfaces 2 and 6 and the image-side surfaces 3 and 7 of the second lens part L12 and the fifth lens part L22 are illustrated to be formed of a planar surface, but the present invention is not limited thereto.

That is, in order to apply the general replica method which facilitates mass production, opposite surfaces, i.e., the object-side surface and the image-side surface, of each of the second lens part L12 and the fifth lens part L22 may be formed of a planar surface. However in a case where a general method of manufacturing a doublet lens is applied, at least one of refractive surfaces, i.e., the image-side surfaces and the object-side surfaces of the second lens part L12 and the fifth lens part L22 may be formed of one of a spherically curved surface and an aspherically curved surface. As described above, when the at least one of the refractive surfaces is formed of the curved surface, the optical system has an increased refractive power, having an improved degree of freedom in designing and excellent various optical characteristics.

With this overall configuration, operational effects of following conditions 1 and 2 will be examined hereunder.

$$0.35 < r1/TTL < 0.8 \quad \text{condition 1}$$

Condition 1 prescribes shape of the first lens and size of the optical system.

Here, r1 is a radius of curvature of the object-side surface 1 of the first lens part L11, and a total track length (TTL) is a distance from the object-side surface 1 of the first lens part L11 to an image plane.

Here, deviation from a lower limit of condition 1 renders the first lens LG1 too susceptible to environmental change, thereby degrading optical performance.

Meanwhile, deviation from an upper limit of condition 1 shortens an overall length of the optical system.

$$0.1 < |r5/r8| < 0.63 \quad \text{condition 2}$$

Here, r5 is a radius of curvature of the object-side surface 5 of the fourth lens part L21 and r8 is a radius of curvature of the image-side surface 8 of the sixth lens part L23.

The optical system of the present invention satisfies condition 2, thereby improving spherical aberration and distortion.

Here, deviation from an upper limit of condition 2 increases an incident angle of light on the image plane. On the other hand, deviation from a lower limit of condition 2 narrows a distance between the first lens LG1 and the second lens LG2.

Now, the present invention will be examined in greater detail through specific numerical examples.

As described above, in the following first to fifth embodiments, the subminiature imaging optical system of the present invention includes, sequentially from an object side, a first lens LG1, a second lens LG2 and an image sensor (not shown) corresponding to an image plane IP, as shown in FIG. 1.

The first lens LG1 has overall positive refractive power, and includes three lens parts: a first lens part L11 having a convex object-side surface and formed of an aspherical surface; a second lens part L12 having an object-side surface 2 in contact with an image-side surface of the first lens part L11; and a third lens part L13 having an object-side surface 3 in contact with an image-side surface of the second lens part L12 and an image-side surface 4 formed of an aspherical surface.

Moreover, the second lens LG2 has overall positive refractive power and includes three lens parts: a fourth lens part L21 having an object-side surface with a convex center and a concave peripheral portion, about an optical axis and formed of an aspherical surface; a fifth lens part L22 having an object-side surface 6 in contact with an image-side surface of the fourth lens part L21; and a sixth lens part L23 having an object-side surface 7 in contact with an image-side surface of the fifth lens part L22 and an image-side surface 8 formed of an aspherical surface.

Here, a stop AS is disposed on one of the object-side surface 2 and the image-plane surface 3 of the second lens part L12 to adjust light amount.

Also, the image sensor is located at the image plane IP and an optical filter including an infrared ray filter, a cover glass and the like may be provided between the second lens LG2 and the image plane IP.

Each of the aspherical surfaces used in each of the embodiments herein is obtained from following Equation 1:

$$Z = \frac{cY^2}{1 + \sqrt{1-(1+K)c^2Y^2}} + AY^4 +$$
$$BY^6 + CY^8 + DY^{10} + EY^{12} + FY^{14} + \ldots ,$$

Equation 1 where Z is a distance from a vertex of a lens in an optical axis, Y is a distance in a direction perpendicular to the optical axis, C is a reciprocal number of a radius r of curvature at a vertex of the lens, K is a conic constant and A, B, C, D, E and F are aspherical coefficients.

First Embodiment

Table 1 below shows numerical values according to a first embodiment of the present invention.

Figure 2:
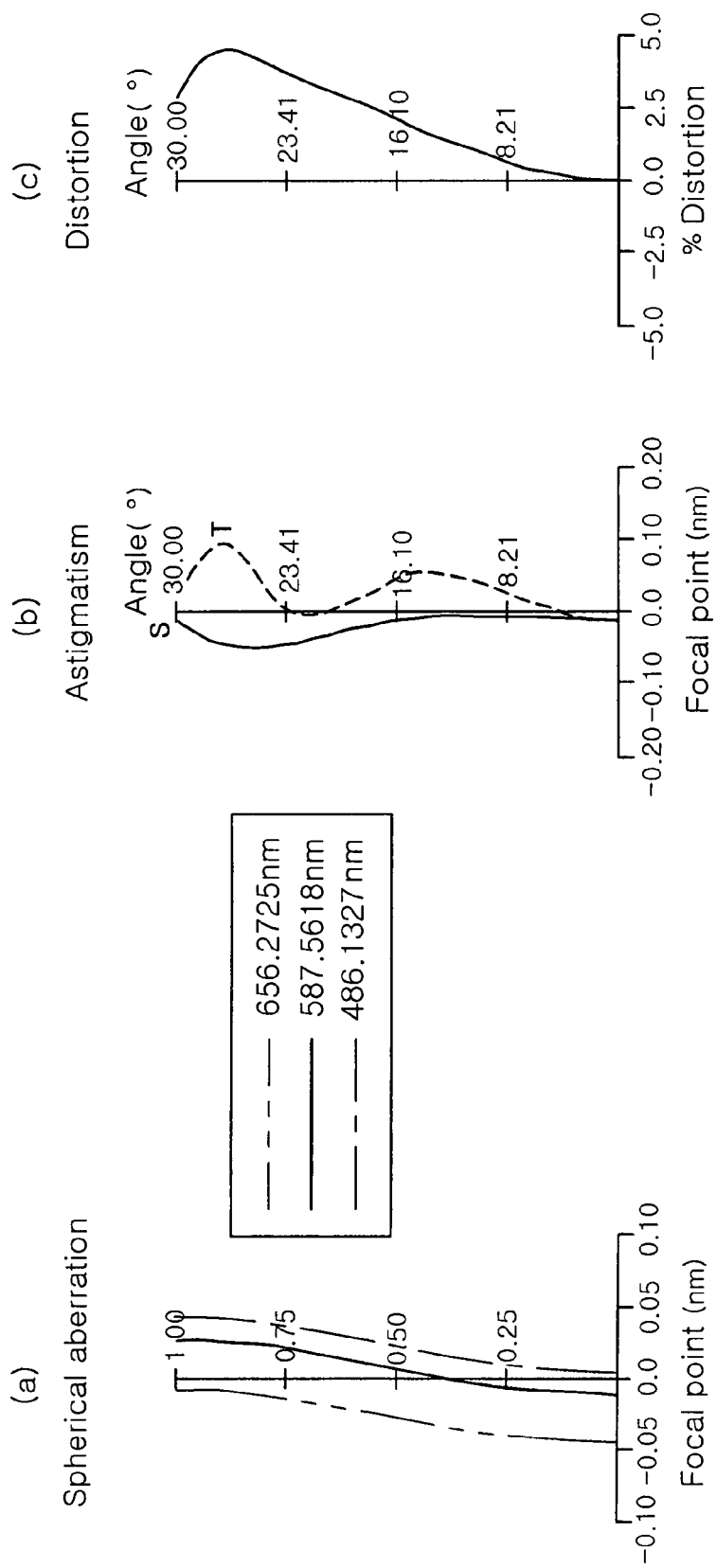
FIG. 2 is an aberrational diagram illustrating the embodiment shown in FIG. 2, in which (a) represents spherical aberration, (b) represents astigmatism and (c) represents distortion.
Figure 3:
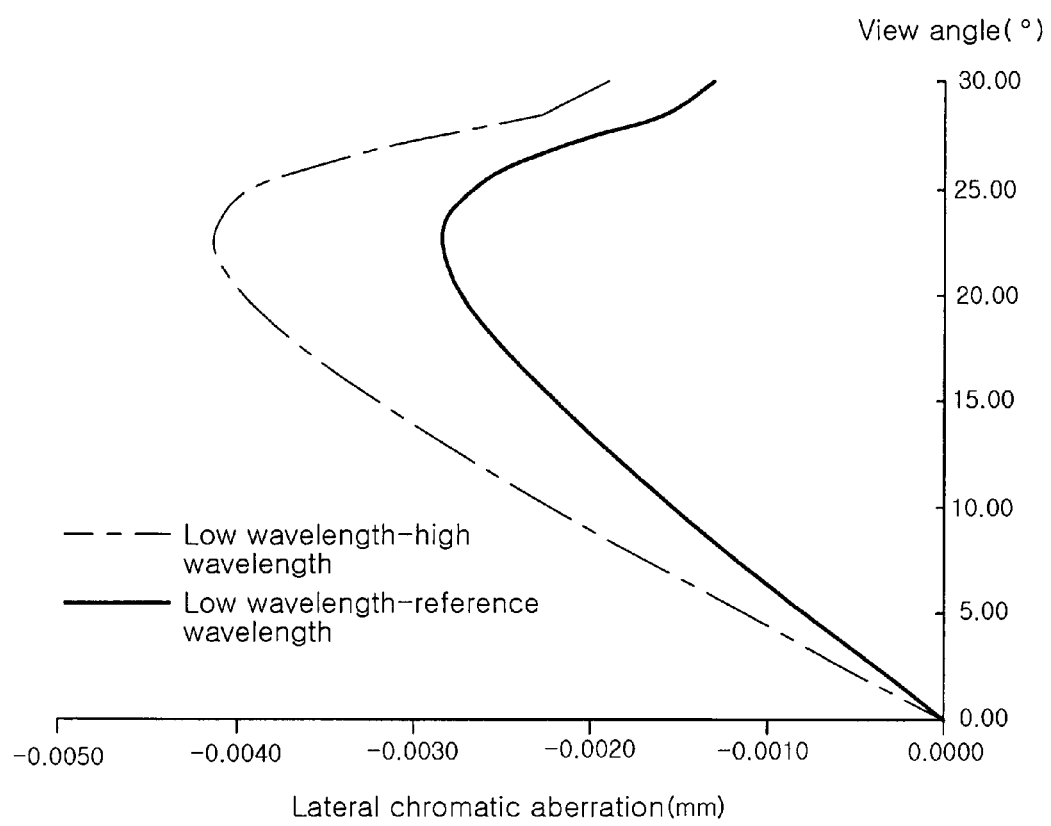
FIG. 3 illustrates lateral chromatic aberration of the embodiment shown in FIG. 3.

FIG. 1 is a view illustrating a lens arrangement of the subminiature imaging optical system according to the first embodiment of the present invention, and FIG. 2 shows aberrations of the embodiment shown in FIG. 2, in which (a) is spherical aberration, (b) is a stigmatism and (c) is distortion. In the following diagrams showing astigmatism, "S" represents sagital and "T" represents tangential. Also, FIG. 3 shows lateral chromatic aberration of the embodiment shown in FIG. 1. A dash-dot line represents lateral chromatic aberration between a low wavelength and a high wavelength, and a solid line represents lateral chromatic aberration between a low wavelength and a reference wavelength.

In the first embodiment, an angle of view is 60 degrees, an F number FNo is 2.8, a total track length (TTL) from the object-side surface 1 of the first lens part L11 to an image plane is 2.78 mm, a total focal length f is 2.01 mm, a focal length f1 of the first lens is 2.93 mm and a focal length f2 of the second lens is 4.83 mm.

In Tables below, the unit for the radius of curvature R, thickness or distance t is mm.

Meanwhile, in the first embodiment, a stop AS is disposed on the object-side surface 2 of the second lens part L12 to adjust light amount.

TABLE 1

| Surface No. | Radius of curvature R | Thickness or distance t | Refractive index $N_d$ | Abbe number $V_d$ | Remark |
|---|---|---|---|---|---|
| *1 | 1.741113 | 0.0947 | 1.5901 | 35.2 | First lens |
| 2 | ∞ | 0.5000 | 1.474 | 65.4 | |
| 3 | ∞ | 0.0698 | 1.4825 | 48.8 | |
| *4 | −159.076 | 0.6690 | | | |
| *5 | 1.747604 | 0.1300 | 1.5901 | 35.2 | Second lens |
| 6 | ∞ | 0.5000 | 1.474 | 65.4 | |
| 7 | ∞ | 0.1200 | 1.4431 | 49 | |
| *8 | 2.810275 | 0.7000 | | | |
| 9 | ∞ | — | | | Image plane |

In Table 1, * represents an aspherical surface, and in the first embodiment, the first surface (the object-side surface of the first lens part L11), the fourth surface (the image-side surface of the third lens part L13), the fifth surface (the object-side surface of the fourth lens part L21) and the eighth surface (the image-side surface of the sixth lens part L23) are aspherical.

Values of aspherical coefficients in the first embodiment according to Equation 1 are noted in Table 2 below.

TABLE 2

| Surface No. | K | A | B | C |
|---|---|---|---|---|
| 1 | 0 | −0.08832 | −0.04766 | |
| 4 | 0 | −0.14555 | −0.54508 | 0.960121 |
| 5 | 0 | −0.37039 | 0.682588 | −1.12085 |
| 8 | 0 | 0.015156 | 0.007652 | −0.12461 |

Second Embodiment

Table 3 shows numerical values according to a second embodiment of the present invention.

Figure 4:
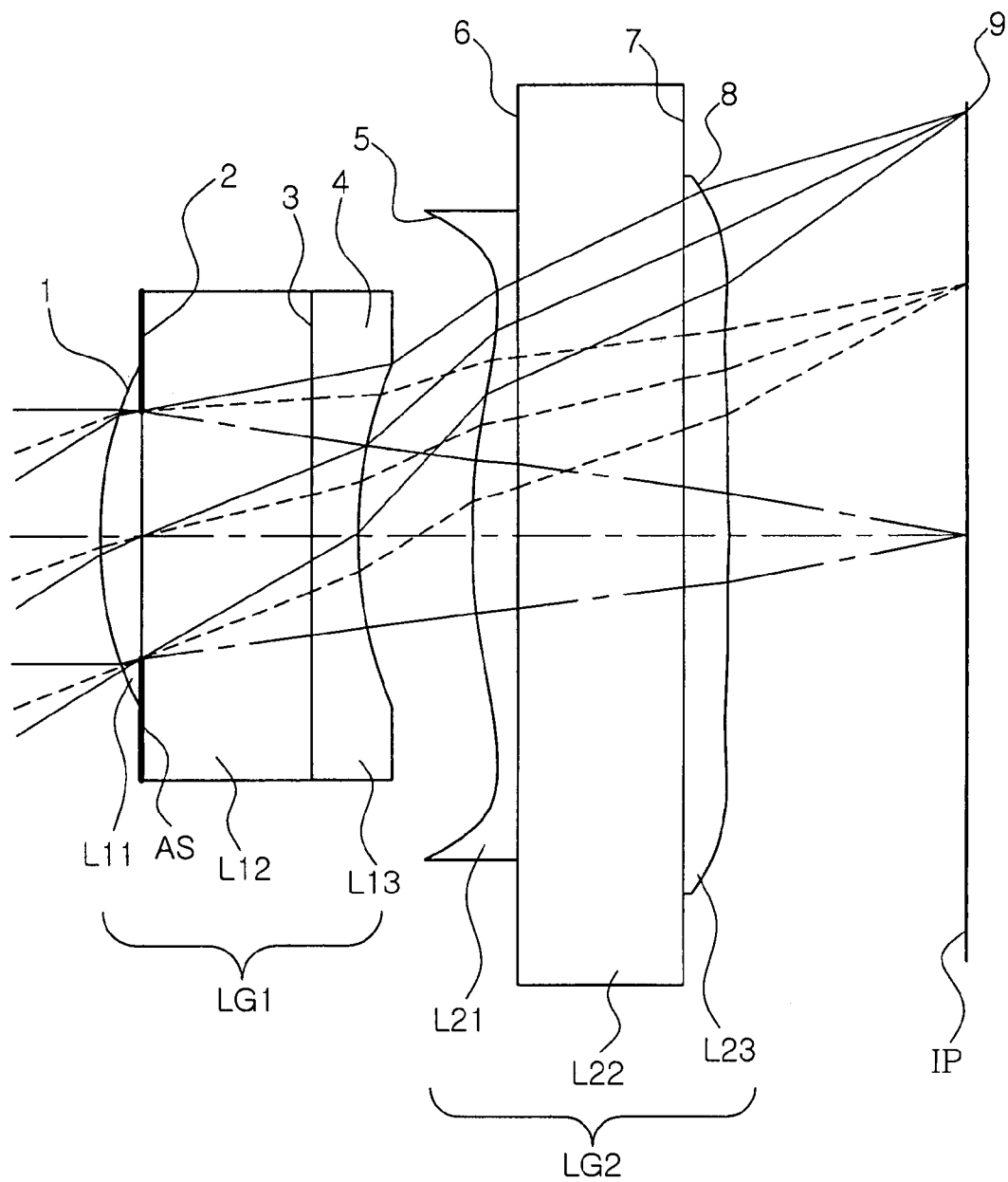
FIG. 4 is a lens configuration view illustrating a subminiature imaging optical system according to a second embodiment of the invention.
Figure 5:
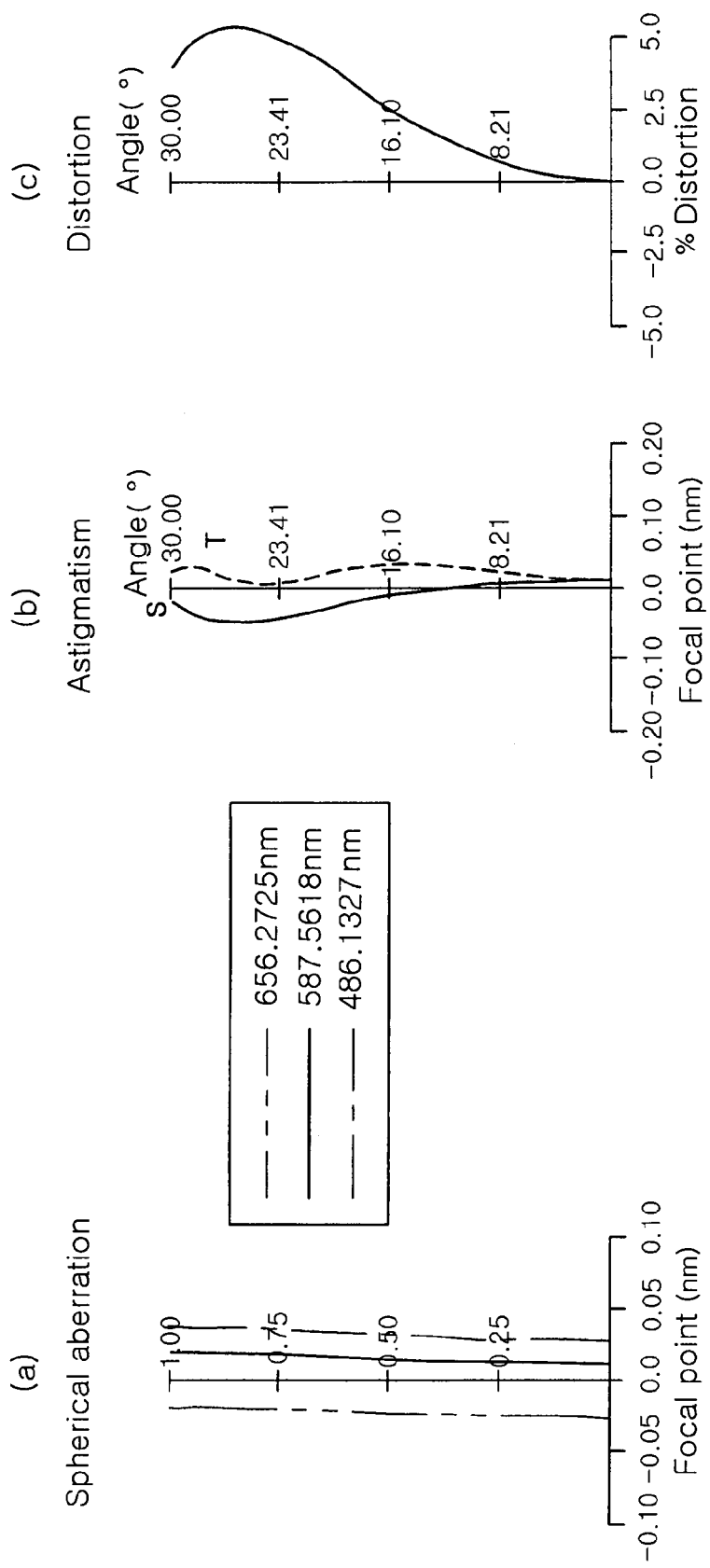
FIG. 5 is an aberrational diagram illustrating the embodiment shown in FIG. 4, in which (a) represents spherical aberration, (b) represents astigmatism and (c) represents distortion.
Figure 6:
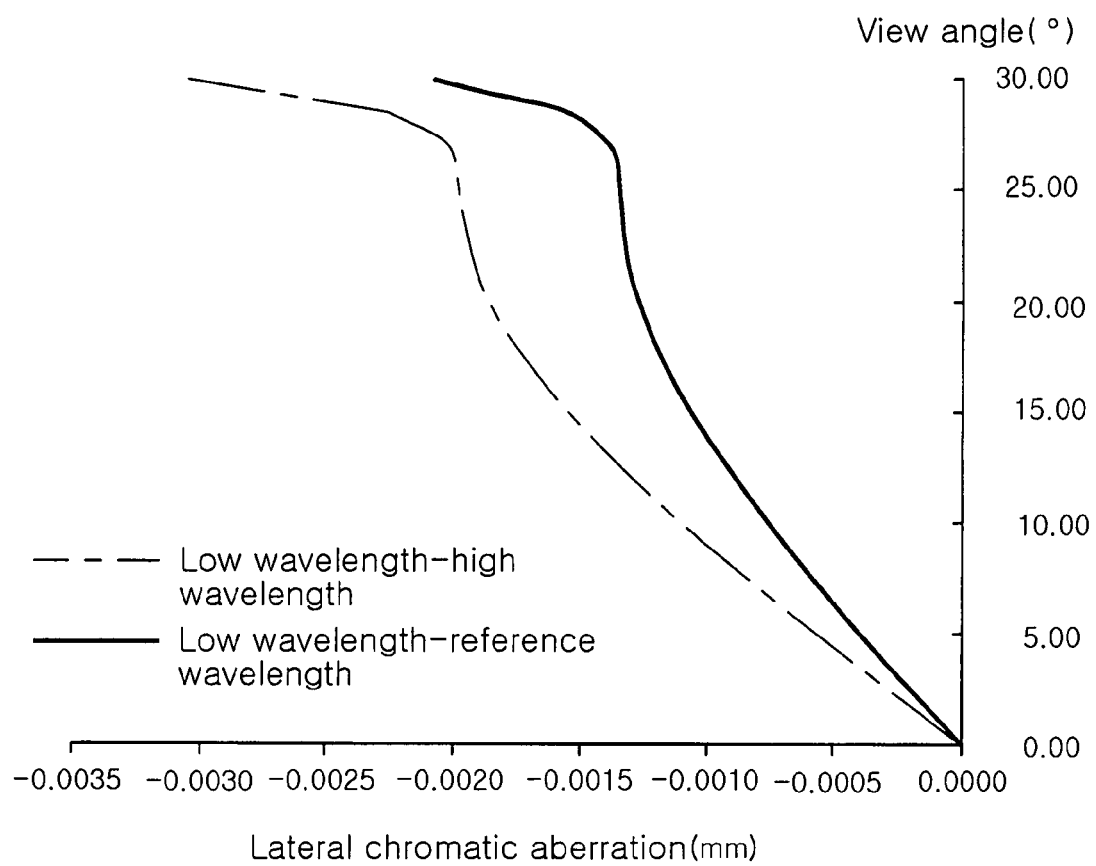
FIG. 6 illustrates lateral chromatic aberration of the embodiment shown in FIG. 4.

FIG. 4 is a view illustrating a lens arrangement of the subminiature imaging optical system according to the second embodiment of the present invention, and FIG. 5 shows aberrations of the embodiment shown in FIG. 4, in which (a) is spherical aberration, (b) is a stigmatism and (c) is distortion. Also, FIG. 6 shows lateral chromatic aberration of the embodiment shown in FIG. 4. A dash-dot line represents lateral chromatic aberration between a low wavelength and a high wavelength and a solid line represents lateral chromatic aberration between a low wavelength and a high wavelength.

In the second embodiment, an angle of view is 60 degrees, an F number FNo is 2.8, a total track length (TTL) from the object-side surface 1 of the first lens part L11 to an image plane is 2.57 mm, a total focal length f is 2.01 mm, a focal length f1 of the first lens is 3.14 mm, and a focal length f2 of the second lens is 3.24 mm.

Meanwhile, in the second embodiment, a stop AS is disposed on the object-side surface 2 of the second lens part L12 to adjust light amount.

TABLE 3

| Surface No. | Radius of curvature R | Thickness or distance t | Refractive index $N_d$ | Abbe number $V_d$ | Remark |
|---|---|---|---|---|---|
| *1 | 1.0410 | 0.1284 | 1.5901 | 35.2 | First lens |
| 2 | ∞ | 0.5000 | 1.474 | 65.4 | |
| 3 | ∞ | 0.1300 | 1.4431 | 49 | |
| *4 | 1.2688 | 0.3470 | | | |
| *5 | 1.9059 | 0.1300 | 1.5148 | 47.8 | Second lens |
| 6 | ∞ | 0.5000 | 1.474 | 65.4 | |
| 7 | ∞ | 0.1364 | 1.5901 | 35.2 | |
| *8 | −12.3649 | 0.7000 | | | |
| 9 | ∞ | — | | | Image plane |

In Table 3, * represents an aspherical surface and in the second embodiment, the first surface (the object-side surface of the first lens part L11), the fourth surface (the image-side surface of the third lens part L13), the fifth surface (the object-side surface of the fourth lens part L21) and the eight surface (the image-side surface of the sixth lens part L23) are aspherical.

Values of aspherical coefficients in the second embodiment according to Equation 1 are noted in Table 4 below.

TABLE 4

| Surface No. | K | A | B | C |
|---|---|---|---|---|
| 1 | 0 | −0.02994 | 0.006405 | |
| 4 | 0 | 0.056828 | 0.047154 | 1.08844 |
| 5 | 0 | −0.21431 | 0.281122 | −0.78924 |
| 8 | 0 | −0.132772 | −0.11354 | −0.07192 |

Third Embodiment

Table 5 below shows numerical values according to a third embodiment of the present invention.

Figure 7:
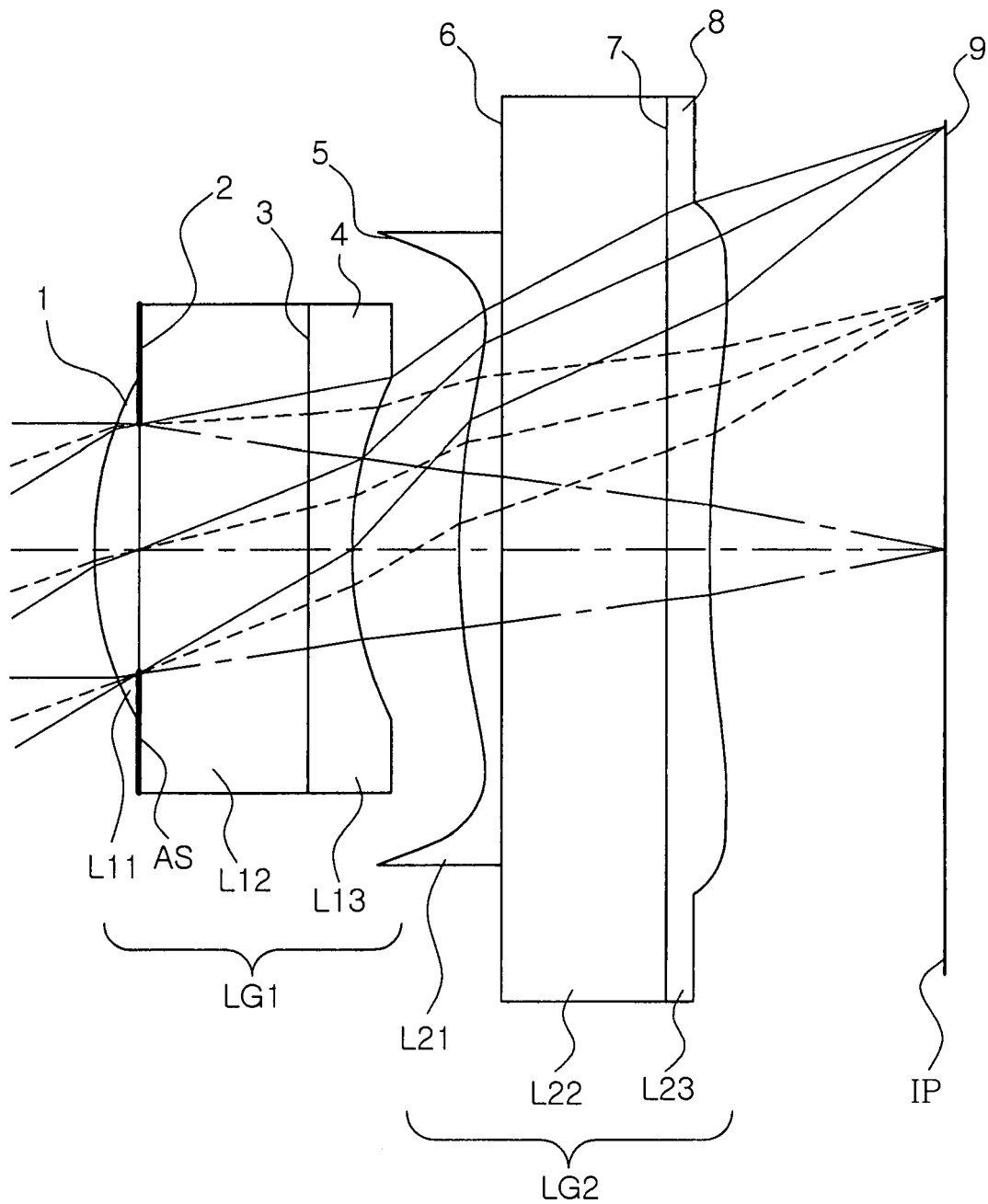
FIG. 7 is a lens configuration view illustrating a subminiature imaging optical system according to a third embodiment of the invention.
Figure 8:
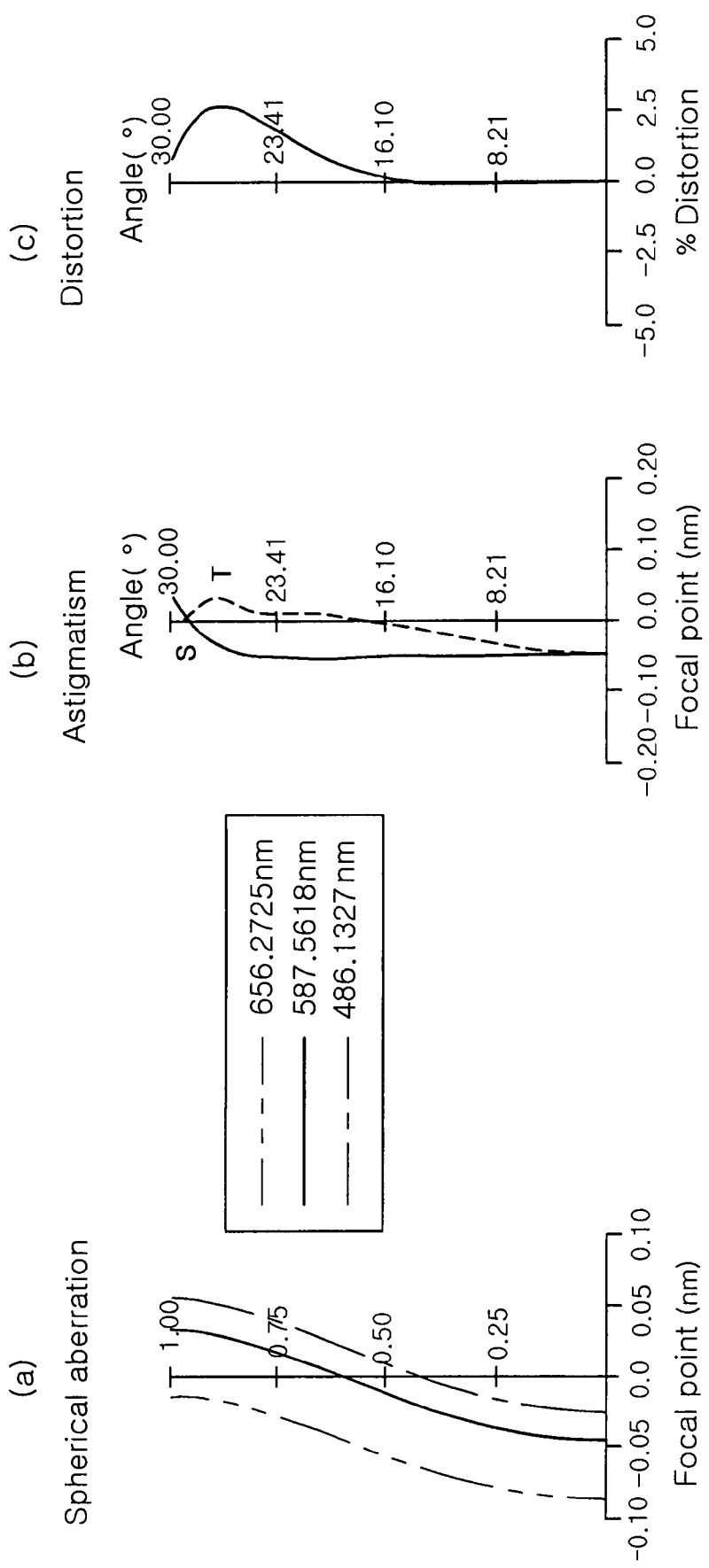
FIG. 8 is an aberration diagram illustrating the embodiment shown in FIG. 7, in which (a) represents spherical aberration, (b) represents astigmatism and (c) represents distortion.
Figure 9:
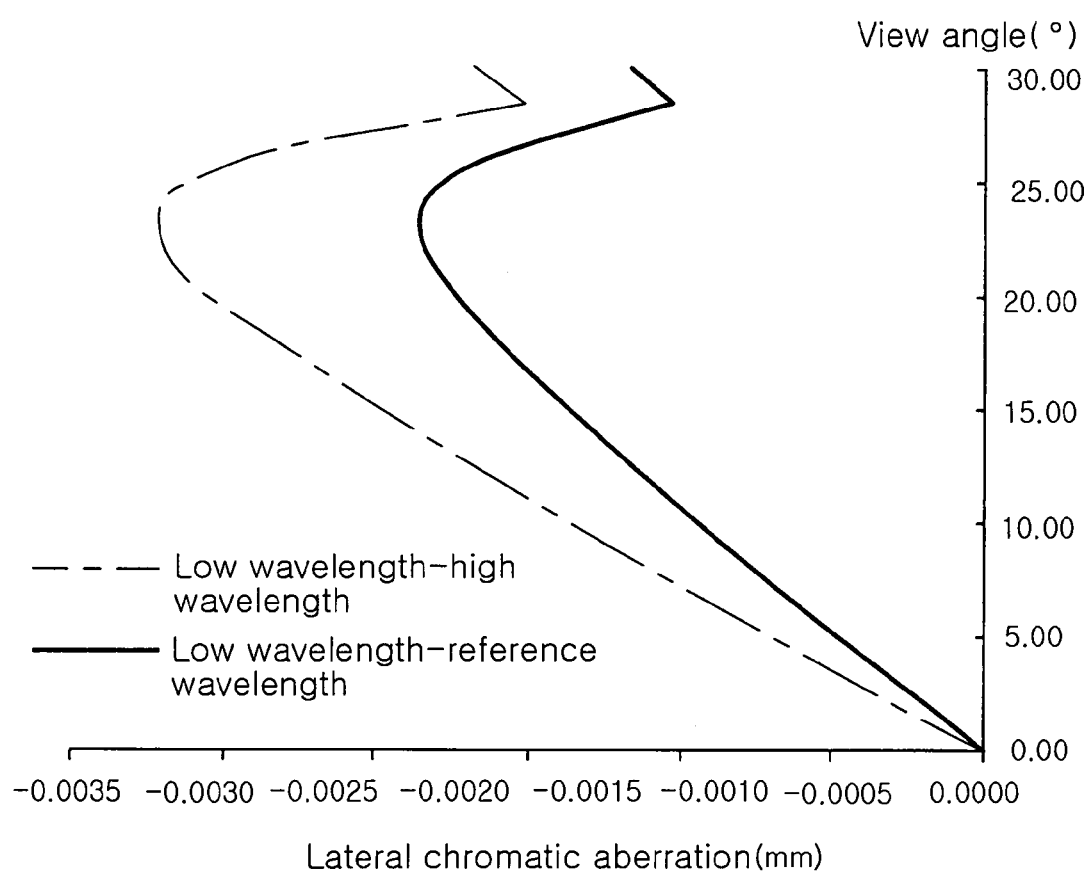
FIG. 9 illustrates lateral chromatic aberration of the embodiment shown in FIG. 7.

FIG. 7 is a view illustrating a lens arrangement of the subminiature imaging optical system according to the third embodiment of the present invention, and FIG. 8 shows aberrations of the third embodiment shown in FIG. 8, in which (a) is spherical aberration, (b) is astigmatism and (c) is distortion. Also, FIG. 9 shows lateral chromatic aberration of the embodiment shown in FIG. 7. A dash-dot line represents lateral chromatic aberration between a high wavelength and a low wavelength and a solid line represents lateral chromatic aberration between a low wavelength and a reference wavelength.

In the third embodiment, an angle of view is 60 degrees, an F number FNo is 2.8, a total track length (TTL) from the object side surface 1 of the first lens part L11 to an image plane is 2.52 mm, a total focal length f is 2.03 mm, a focal length f1 of the first lens is 3.28 mm, and a focal length f2 of the second lens is 3.74 mm.

Meanwhile, in the third embodiment, a stop AS is disposed on the object-side surface 2 of the second lens part L12 to adjust light amount.

TABLE 5

| Surface No. | Radius of curvature R | Thickness or distance t | Refractive index $N_d$ | Abbe number $V_d$ | Remark |
|---|---|---|---|---|---|
| *1 | 0.998562 | 0.1288 | 1.5901 | 35.2 | First lens |
| 2 | ∞ | 0.5000 | 1.474 | 65.4 | |
| 3 | ∞ | 0.1300 | 1.4431 | 49 | |
| *4 | 1.082117 | 0.3161 | | | |
| *5 | 1.438999 | 0.1300 | 1.5901 | 35.2 | Second lens |
| 6 | ∞ | 0.5000 | 1.474 | 65.4 | |
| 7 | ∞ | 0.1200 | 1.4431 | 49 | |
| *8 | 2.468343 | 0.7000 | | | |
| 9 | ∞ | — | | | Image plane |

In Table 5, * represents an aspherical surface, and in the third embodiment, the first surface (the object-side surface of the first lens part L11), the fourth surface (the image-side surface of the third lens part L13), the fifth surface (the object-side surface of the fourth lens part L21) and the eighth surface (the image-side surface of the sixth lens part L23) are aspherical.

Values of aspherical coefficients in the third embodiment according to Equation 1 are noted in Table 6 below.

TABLE 6

| Surface No. | K | A | B | C |
|---|---|---|---|---|
| 1 | 0 | −0.1155 | 0.225701 | |
| 4 | 0 | −0.15529 | 0.611481 | 0.012612 |
| 5 | 0 | −0.6564 | 1.422552 | −2.11593 |
| 8 | 0 | −0.37637 | 0.570864 | −0.46615 |

Fourth Embodiment

Table 7 below shows numerical values according to a fourth embodiment of the present invention.

Figure 10:
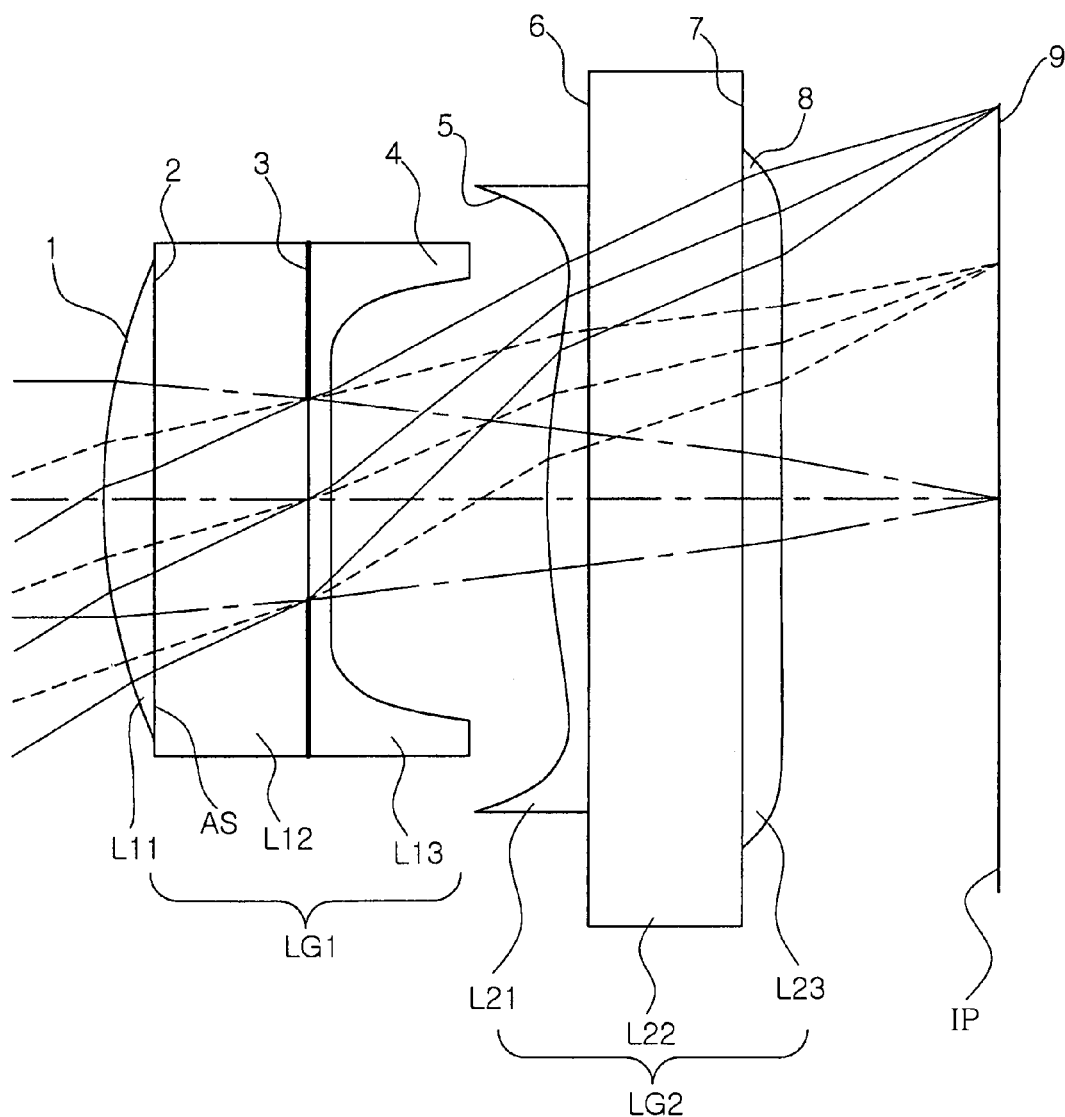
FIG. 10 is a lens configuration view illustrating a subminiature imaging optical system according to a fourth embodiment of the invention.
Figure 11:
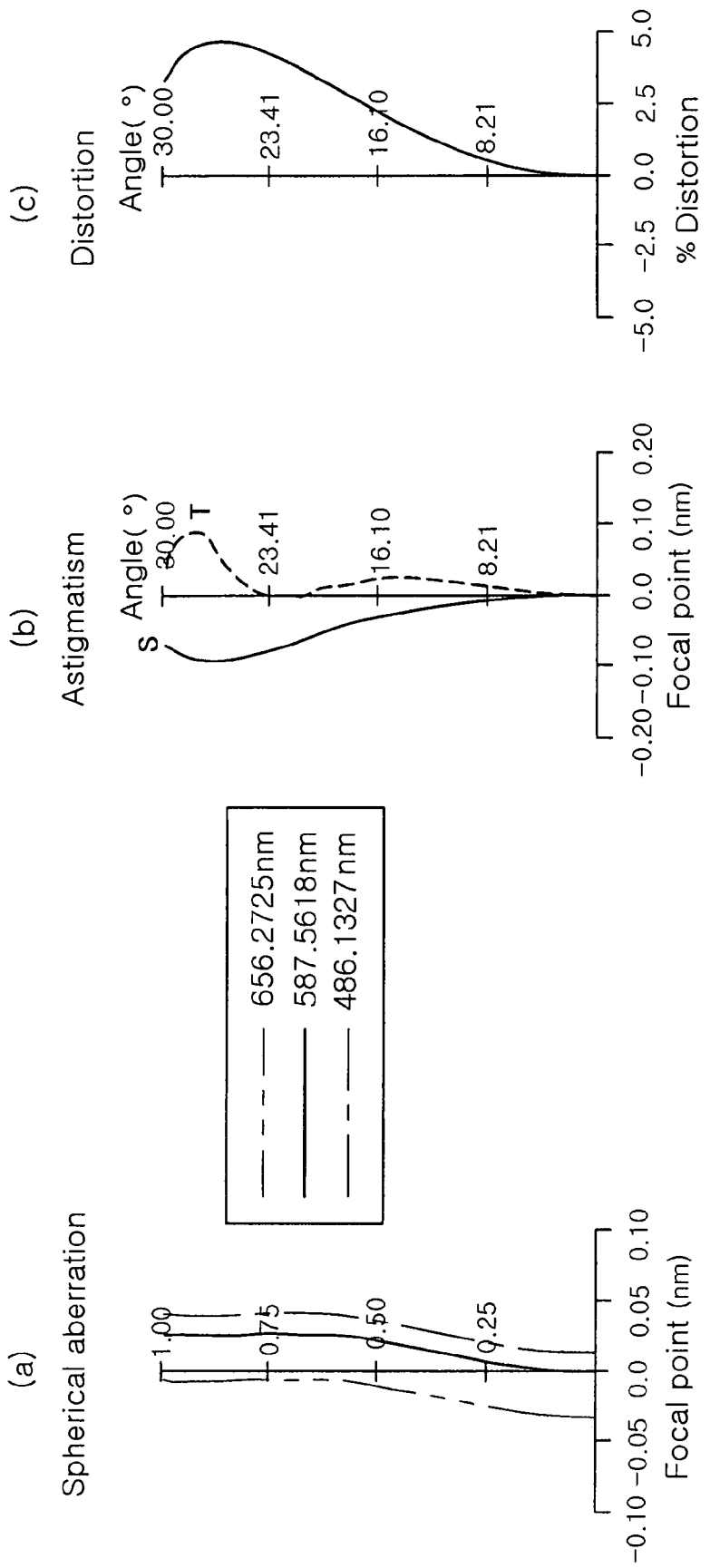
FIG. 11 is an aberrational diagram illustrating the embodiment shown in FIG. 10, in which (a) represents spherical aberration, (b) represents astigmatism and (c) represents distortion.
Figure 12:
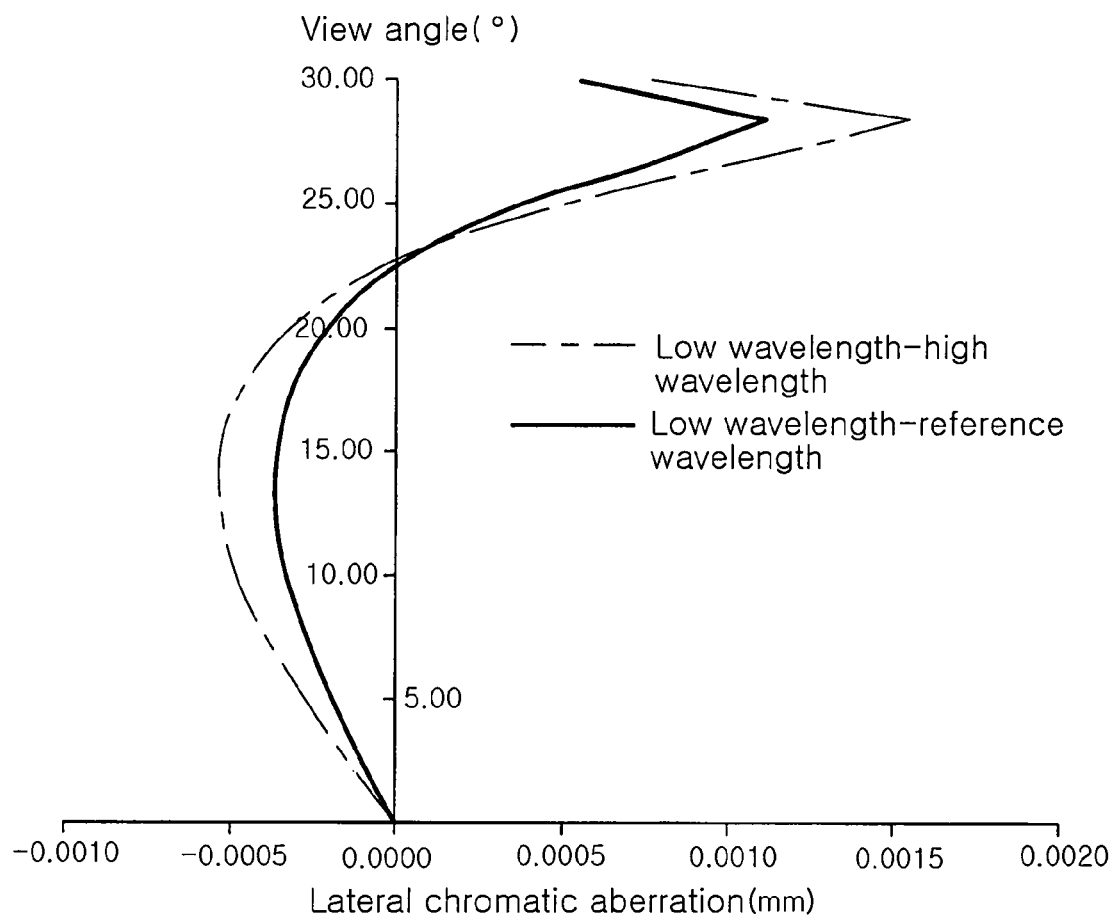
FIG. 12 illustrates lateral chromatic aberration of the embodiment shown in FIG. 10.

FIG. 10 is a view illustrating a lens arrangement of the subminiature imaging optical system according to the fourth embodiment of the present invention, and FIG. 11 shows aberrations of the embodiment shown in FIG. 10, in which (a) is spherical aberration, (b) is astigmatism and (c) is distortion. Also, FIG. 12 shows lateral chromatic aberration of the embodiment shown in FIG. 10. A dash-dot line represents lateral chromatic aberration between a low wavelength and a high wavelength and a solid line represents lateral chromatic aberration between a low wavelength and a reference wavelength.

In the fourth embodiment, an angle of view is 60 degrees, an F number FNo is 2.8, a total track length (TTL) from the object-side surface 1 of the first lens part L11 to an image plane is 2.87 mm, a total focal length f is 2.01 mm, a focal length f1 of the first lens is 3.02 mm and a focal length f2 of the second lens is 3.45 mm.

Meanwhile, in the fourth embodiment, a stop AS is disposed on the object-side surface 3 of the second lens part L12 to adjust light amount.

TABLE 7

| Surface No. | Radius of curvature R | Thickness or distance t | Refractive index $N_d$ | Abbe number $V_d$ | Remark |
|---|---|---|---|---|---|
| *1 | 1.5910 | 0.1602 | 1.5901 | 35.2 | First lens |
| 2 | ∞ | 0.5000 | 1.474 | 65.4 | |
| 3 | ∞ | 0.0650 | 1.4431 | 49 | |
| *4 | 9.2060 | 0.6962 | | | |
| *5 | 2.2446 | 0.1300 | 1.5901 | 35.2 | Second lens |
| 6 | ∞ | 0.5000 | 1.474 | 65.4 | |
| 7 | ∞ | 0.1200 | 1.5901 | 35.2 | |
| *8 | −19.2762 | 0.7000 | | | |
| 9 | ∞ | — | | | Image plane |

In Table 7, * represents an aspherical surface, and in the fourth embodiment, the first surface (the object-side surface of the first lens part L11), the fourth surface (the image-side surface of the third lens part L13), the fifth surface (the object-side surface of the fourth lens part L21) and the eighth surface (the image-side surface of the sixth lens part L23) are aspherical.

Values of aspherical coefficients in the fourth embodiment according to Equation 1 are noted in Table 8 below.

TABLE 8

| Surface No. | K | A | B | C |
|---|---|---|---|---|
| 1 | 0 | −0.04449 | −0.02074 | |
| 4 | 0 | 0.190434 | −3.90139 | 16.80665 |
| 5 | 0 | −0.16502 | 0.390472 | −0.88767 |
| 8 | 0 | 0.115832 | −0.02354 | −0.12426 |

Fifth Embodiment

Table 9 below shows numerical values according to a fifth embodiment of the present invention.

Figure 13:
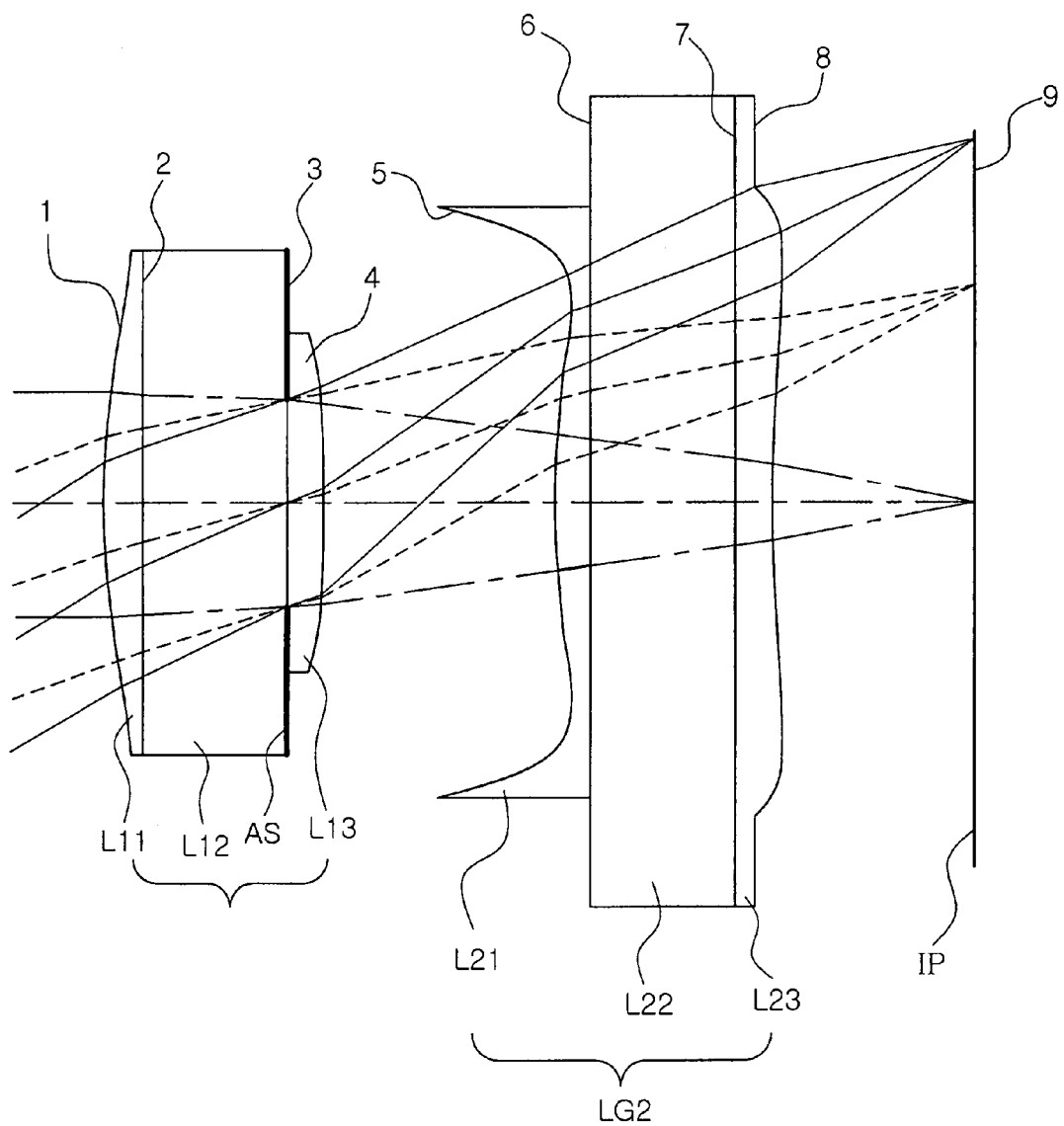
FIG. 13 is a lens configuration view illustrating a subminiature imaging optical system according to a fifth embodiment of the invention.
Figure 14:
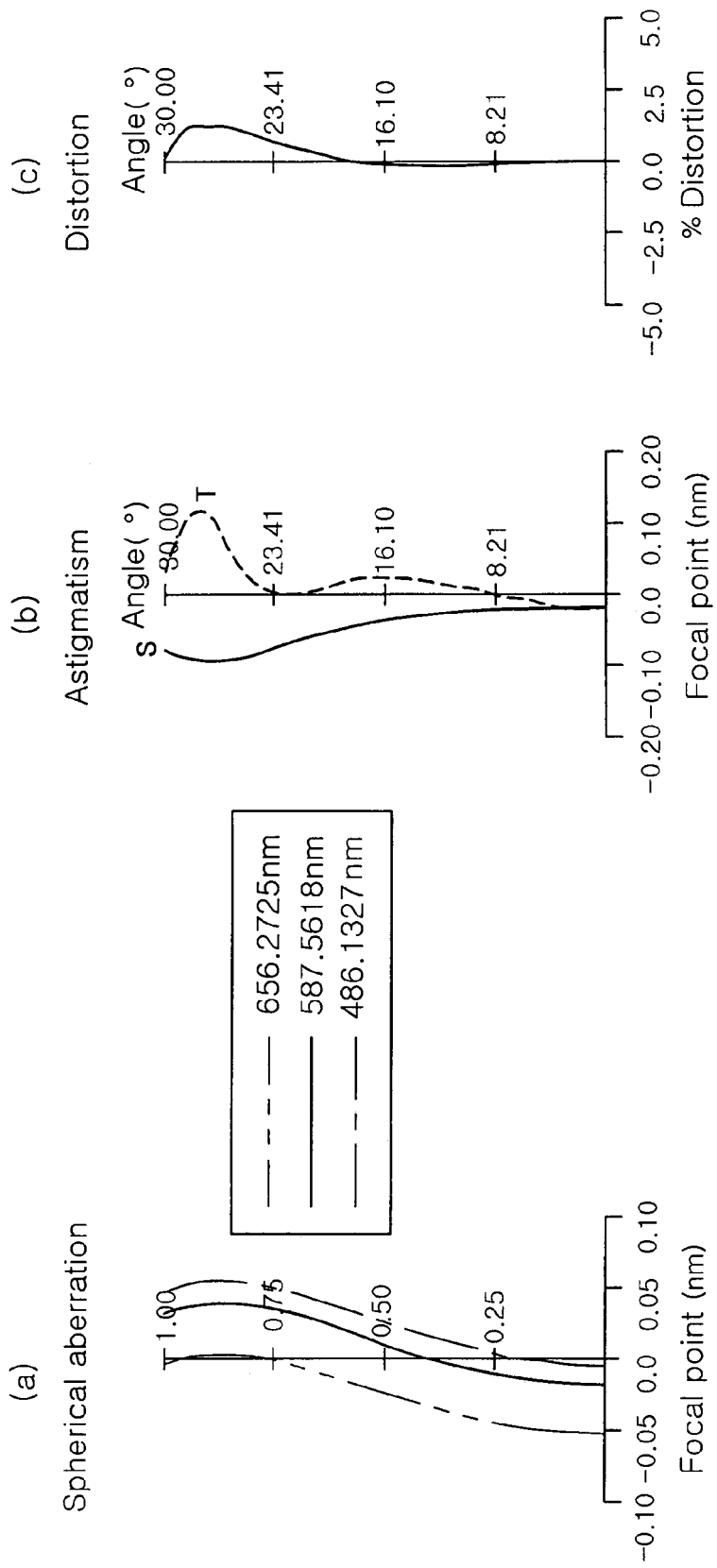
FIG. 14 is an aberrational diagram illustrating the embodiment shown in FIG. 13, in which (a) represents spherical aberration, (b) represents astigmatism, and (c) represents distortion.
Figure 15:
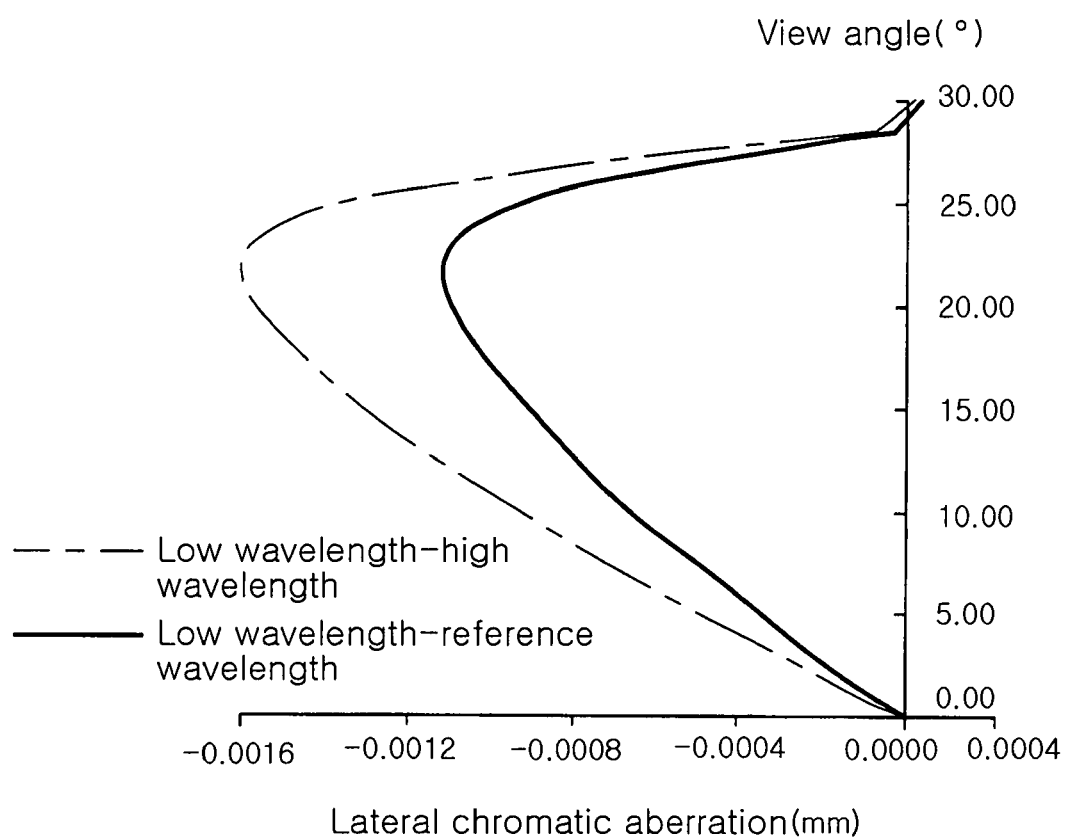
FIG. 15 illustrates lateral chromatic aberration of the embodiment shown in FIG. 13.

FIG. 13 is a view illustrating a lens arrangement of the subminiature imaging optical system according to the fifth embodiment of the present invention, and FIG. 14 shows aberrations of the embodiment shown in FIG. 13, in which (a) is spherical aberration, (b) is astigmatism and (c) is distortion. Also, FIG. 15 shows lateral chromatic aberration of the embodiment shown in FIG. 13. A dash-dot line represents lateral chromatic aberration between a low wavelength and a high wavelength and a solid line represents lateral chromatic aberration between a low wavelength and a reference wavelength.

In the fifth embodiment, an angle of view is 60 degrees, an F number FNo is 2.8, a total track length (TTL) from an object-side surface 1 of the first lens part L11 to an image plane is 3.00 mm, a total focal length f is 2.06 mm, a focal length f1 of the first lens is 2.83 mm and a focal length f2 of the second lens is 5.26 mm.

Meanwhile, in the fifth embodiment, a stop AS is disposed on the object-side surface 3 of the second lens part L12 to adjust light amount.

TABLE 9

| Surface No. | Radius of curvature R | Thickness or distance t | Refractive index $N_d$ | Abbe number $V_d$ | Remark |
|---|---|---|---|---|---|
| *1 | 2.3486 | 0.1344 | 1.5901 | 35.2 | First lens |
| 2 | ∞ | 0.5000 | 1.474 | 65.4 | |
| 3 | ∞ | 0.1226 | 1.5901 | 35.2 | |
| *4 | −5.0676 | 0.7990 | | | |
| *5 | 2.1051 | 0.1300 | 1.5901 | 35.2 | Second lens |
| 6 | ∞ | 0.5000 | 1.474 | 65.4 | |
| 7 | ∞ | 0.1200 | 1.4431 | 49 | |
| *8 | 4.2187 | 0.7000 | | | |
| 9 | ∞ | — | | | Image plane |

In Table 9, * represents an aspherical surface, and in the fifth embodiment, the first surface (the object-side surface of the first lens part L11), the fourth surface (the image-side surface of the third lens part L13), the fifth surface (the object-side surface of the fourth lens part L21) and the eighth surface (the image-side surface of the sixth lens part L23) are aspherical.

Values of aspherical coefficients in the fifth embodiment according to Equation 1 are noted in Table 10 below.

TABLE 10

| Surface No. | K | A | B | C |
|---|---|---|---|---|
| 1 | 0 | −0.08749 | −0.04326 | |
| 4 | 0 | −0.03189 | −0.50788 | −0.32828 |
| 5 | 0 | −0.40412 | 1.00041 | −1.40748 |
| 8 | 0 | −0.24978 | 0.479152 | −0.37304 |

In the meantime, values of conditions 1 to 2 for the above first to fifth embodiments are noted in Table 11.

TABLE 11

| | Condition 1 (r1/TTL) | Condition 2 $|r5/r8|$ |
|---|---|---|
| First Embodiment | 0.626 | 0.622 |
| Second Embodiment | 0.405 | 0.154 |
| Third Embodiment | 0.396 | 0.583 |
| Fourth Embodiment | 0.554 | 0.116 |
| Fifth Embodiment | 0.783 | 0.499 |

As can be seen from the above embodiments, the subminiature imaging optical system with excellent aberrational characteristics as shown in FIGS. 2 and 3 is obtained according to the present invention.

As set forth above, according to exemplary embodiments of the invention, a small number of lenses with a first lens composed of three lens parts and a second lens composed of three lens parts are employed to effectively correct various aberrations such as spherical aberration, astigmatism and distortion. Also, a stop is disposed inside the first lens, i.e., on an object-side surface or an image-side surface of the second lens part to achieve a smaller size and a lighter weight subminiature imaging optical system improved in lateral chromatic aberration.

Moreover, only two sheets of lenses are adopted to produce an imaging optical system which is ultra-miniaturized and exhibits high resolution.

In addition, refracting surfaces of the lens are formed of an aspherical surface in a suitable shape, thereby attaining a subminiature imaging optical system with superior aberrational characteristics and high resolution.

Further, a replica method can be employed to realize a subminiature optical system using a wafer-scale lens, which in turn facilitates mass production.

While the present invention has been shown and described in connection with the exemplary embodiments, it will be apparent to those skilled in the art that modifications and variations can be made without departing from the spirit and scope of the invention as defined by the appended claims.

What is claimed is:

1. A subminiature imaging optical system comprising:

a first lens having overall positive refractive power, the first lens comprising a first lens part having a convex object-side surface; a second lens part having an object-side surface in contact with an image-side surface of the first lens part; and a third lens part having an object-side surface in contact with an image-side surface of the second lens part; and a second lens having overall positive refractive power, the second lens comprising a fourth lens part having an object-side surface with a convex center and a concave peripheral portion, about an optical axis; a fifth lens part having an object-side surface in contact with an image-side surface of the fourth lens part; and a sixth lens part having an object-side surface in contact with an image-side surface of the fifth lens part, wherein the second lens part has a stop provided on one of the object-side surface and the image-side surface thereof to adjust light amount.

2. The subminiature imaging optical system of claim 1, satisfying following condition 1:

$$0.35 < r1/TTL < 0.8 \qquad \text{condition 1,}$$

wherein r1 is a radius of curvature of the object-side surface of the first lens part, and TTL is a distance between the object-side surface of the first lens part and an image plane.

3. The subminiature imaging optical system of claim 2, satisfying following condition 2:

$$0.1 < |r5/r8| < 0.63 \qquad \text{condition 2,}$$

wherein r5 is a radius of curvature of the obiect-side surface of the fourth lens part, and r8 is a radius of curvature of an image-side surface of the sixth lens part.

4. The subminiature imaging optical system of claim 1, satisfying following condition 2:

$$0.1 < |r5/r8| < 0.63 \qquad \text{condition 2,}$$

wherein r5 is a radius of curvature of the object-side surface of the fourth lens part, and r8 is a radius of curvature of an image-side surface of the sixth lens part.

5. The subminiature imaging optical system of claim 1, wherein at least one of the object-side surface of the first lens part, an image-side surface of the third lens part, the object-side surface of the fourth lens part and an image-side surface of the sixth lens part is formed of an aspherical surface.

6. The subminiature imaging optical system of claim 1, wherein the object-side surfaces and the image-side surfaces of the second lens part and the fifth lens part are formed of a planar surface.

7. The subminiature imaging optical system of claim 1, wherein the first lens part, the third lens part, the fourth lens part and the sixth lens part are formed of polymer by a replica method.

* * * * *

UNITED STATES PATENT AND TRADEMARK OFFICE
CERTIFICATE OF CORRECTION

| | | |
|---|---|---|
| PATENT NO. | : 7,474,480 B2 | Page 1 of 1 |
| APPLICATION NO. | : 11/987387 | |
| DATED | : January 6, 2009 | |
| INVENTOR(S) | : Hye Ran Oh et al. | |

It is certified that error appears in the above-identified patent and that said Letters Patent is hereby corrected as shown below:

Column 12, Line 57, change "obiect-side" to --object-side--.

Signed and Sealed this

Twenty-fourth Day of March, 2009

JOHN DOLL
*Acting Director of the United States Patent and Trademark Office*